United States Patent [19]

Mijac et al.

[11] Patent Number: 4,835,001
[45] Date of Patent: May 30, 1989

[54] BAKED GOODS MADE WITH SUCROSE FATTY ACID ESTERS

[75] Inventors: Marko D. Mijac, Cincinnati; Timothy B. Guffey, West Chester, both of Ohio

[73] Assignee: The Proctor & Gamble Company, Cincinnati, Ohio

[21] Appl. No.: 94,950

[22] Filed: Sep. 9, 1987

[51] Int. Cl.$^4$ .................. A21D 2/16; A21D 13/08
[52] U.S. Cl. ..................... 426/556; 426/551; 426/553
[58] Field of Search ................ 426/549, 556, 553, 551

[56] References Cited

U.S. PATENT DOCUMENTS

| | | | |
|---|---|---|---|
| 2,132,436 | 3/1934 | Reynolds et al. | 426/549 |
| 3,600,186 | 8/1971 | Mattson et al. | 426/611 |
| 3,954,976 | 5/1976 | Mattson et al. | 424/180 |
| 3,963,699 | 6/1976 | Rizzi et al. | 426/611 |
| 4,005,195 | 1/1977 | Jandacek | 426/658 |
| 4,005,196 | 4/1977 | Jandacek | 426/658 |
| 4,034,083 | 6/1977 | Mattson | 424/180 |
| 4,241,054 | 12/1980 | Volpenhein | 424/180 |
| 4,264,583 | 1/1981 | Jandacek | 424/240 |
| 4,368,213 | 1/1983 | Hollenbach et al. | 426/590 |
| 4,382,924 | 11/1983 | Berling et al. | 426/601 |
| 4,461,782 | 7/1984 | Robbins et al. | 426/549 |
| 4,517,360 | 5/1985 | Volpenhein | 536/119 |

FOREIGN PATENT DOCUMENTS 0233856 9/1987 European Pat. Off. .

OTHER PUBLICATIONS

Irish Pat. Appln. 87–531, Bernhardt, avail. to public 9/3/87, equiv. of European Appln. 0236288, Bernhardt, published 9/9/87.
Fallat et al., "Short Term Study of Sucrose Polyester a Nonabsorbable Fat-Like Material as a Dietary Agent for Lowering Plasma Cholesterol," The American Journal of Clinical Nutrition 29, Nov. 1976, pp. 1204–1215.
Glueck et al., "The Lowering of Plasma Cholesterol by Sucrose Polyester in Subjects Consuming Diets with 800, 300 or less than 500 Milligrams of Cholesterol per Day", The American Journal of Clinical Nutrition 32, Aug. 1979, pp. 1636–1644.

Primary Examiner—Donald E. Czaja
Assistant Examiner—Helen Pratt
Attorney, Agent, or Firm—Gary M. Sutter; Eric W. Guttag; Richard C. Witte

[57] ABSTRACT

Dough compositions that are baked to form pastries, biscuits, shortbreads and shortcakes having improved tenderness are disclosed. This benefit is achieved by incorporating into the dough a fat product comprising sucrose fatty acid esters having at least 4 fatty acid ester groups and optionally other fat ingredients. The fat product has a penetration between about 120 mm/10 and about 350 mm/10 at 70° F. (21° C.) and a yield point between about 500 dynes/cm$^2$ and about 10,000 dynes/cm$^2$ at 70° F. (21° C.). The dough is made by a process employing a low shear method of mixing.

14 Claims, No Drawings

BAKED GOODS MADE WITH SUCROSE FATTY ACID ESTERS

FIELD OF THE INVENTION

This invention relates to dough compositions for making improved baked goods. The invention particularly relates to pastries, biscuits, shortbreads and shortcakes having a more tender texture.

BACKGROUND OF THE INVENTION

Several references disclose baked goods made with sucrose fatty acid esters. For example, U.S. Pat. No. 4,461,782 of Robbins et al., issued July 24, 1984, discloses baked products comprising from about 12% to about 60% of a nonabsorbable, nondigestible liquid polyol polyester and from about 25% to about 85% microcrystalline cellulose or a mixture of microcrystalline cellulose and flour, in a weight ratio of cellulose:flour of at least 1:1. The preferred polyol polyesters are said to be sucrose hexaoleate, sucrose heptaoleate, and sucrose octaoleate. Specific examples of baked goods listed in the Robbins et al. patent are bread, cake, and wafers.

U.S. Pat. No. 3,600,186 of Mattson et al., issued Aug. 17, 1971, discloses low-calorie food compositions produced by replacing at least a portion of the fat content of a conventional food with a sugar fatty acid ester or sugar alcohol fatty acid ester having at least 4 fatty acid ester groups with each fatty acid havig from 8 to 22 carbons. Sucrose fatty acid esters are preferred esters. Specific food examples given in the Mattson et al. patent include bread, cakes, and culinary mixes.

In a journal article, Fallat et al. discuss a clinical in which intermediate melting sucrose fatty acid esters are used in baked foods. Fallat et al., "Short Term Study of Sucrose Polyester a Nonabsorable Fat-like Material as a Dietary Agent for Lowering Plasma Cholesterol," *The American Journal of Clinical Nutrition* 29, November 1976, pp. 1204–1215.

Glueck et al. disclose a clinical in which sucrose polyester is used to make baked foods. The sucrose polyester is a mixture of 43% octaester, 43% heptaester, and 14% hexaester. Glueck et al., "The Lowering of Plasma Cholesterol by Sucrose Polyester in Subjects Consuming Diets with 800, 300, or Less Than 500 Milligrams of Cholesterol per Day," *The American Journal of Clinical Nutrition* 32, August 1979, pp. 1636–1644.

U.S. Pat. No. 4,034,083 of Mattson, issued July 5, 1977, discloses polyol fatty acid polyesters having at least 4 fatty acid ester groups fortified with fat-soluble vitamins and used in pharmaceutical compositions and low-calorie foods. The polyesters are said to be useful for breadmaking and cakemaking.

None of these references relates to pastries, biscuits, shortbreads or shortcakes, and non suggests that tenderness can be improved in these baked goods by the use of sucrose fatty acid esters instead of triglycerides.

It is therefore an object of the present invention to make novel pastry doughs, biscuit doughs, and shortbread and shortcake doughs, that can be baked to produce improved baked goods.

It is specifically an object of the present invention to make pastries, biscuits, shortbreads, and shortcakes having improved tenderness compared to like baked goods of the same recipe made with triglyceride shortenings.

It is particular object of the present invention to make more tender pie crusts.

These and other objects of the present invention will become evident from the disclosure herein.

All percentages are by weight unless otherwise defined.

SUMMARY OF THE INVENTION

The invention relates to dough compositions that can be baked to form pastries, biscuits, shortbreads and shortcakes having improved tenderness. This benefit is achieved by incorporating sucrose fatty acid esters of the invention into the dough formulations. Specifically, one embodiment of the present invention relates to a pastry dough comprising:

(a) from about 20% to about 50% of a fat product comprising:
  (i) from about 10% to about 100% sucrose fatty acid esters having at least 4 fatty acid ester groups, wherein each fatty acid group has from about 8 to about 22 carbon atoms; and
  (ii) from about 0% to about 90% other fat ingredients selected from the group consisting of shortenings, margarines, fats, oils, and mixtures thereof;
  (iii) wherein the fat product has a penetration between about 120 mm/10 and about 350 mm/10 at 70° F. (21° C.); and
  (iv) wherein the fat product has a yield point between about 500 dynes/cm$^2$ and about 10,000 dynes/cm$^2$ at 70° F. (21° C.);
(b) from about 30% to about 70% flour; and
(c) from about 5% to about 30% of a liquid selected from the group consisting of water, milk, and mixtures thereof;

said pastry dough being made by a process employing a low shear method of mixing.

Biscuit, shortbread and shortcake doughs are similarly comprised: biscuit doughs—5–30% fat product, 35–60% flour, 25–45% water and/or milk; shortbread doughs—25–55% fat product, 35–60% flour, 0–20% water and/or milk; shortcake doughs—5–30% fat product, 30–65% flour, 20–50% water and/or milk.

DETAILED DESCRIPTION OF THE INVENTION

Tenderness in baked goods is usually defined as the amount of force required to bite into a baked product, or the amount of force required to break the product into small pieces as it is chewed.

The strength of the gluten network formed when flour is wetted determines how tender a pastry, biscuit, shortbread or shortcake will be. The degree to which the fat and flour are mixed greatly impacts the strength of the gluten network. The more they are mixed, the more discontinuous the gluten network becomes, and the more tender the baked goods will be. However, overmixing makes the baked goods difficult to handle.

Surprisingly, shortenings containing the sucrose fatty acid esters of the invention have been found to be lower in yield point than triglyceride shortenings with similar penetrations. They have also unexpectedly been found to create pastries, biscuits, shortbreads and shortcakes which are more tender than similar baked goods of the same recipe made with triglyceride shortenings. While not intending to be limited by theory, it is believed that because the sucrose ester shortenings deform more easily than triglyceride shortenings, the shortenings are more completely coated with flour for the same amount of mixing. This allows the baked good to be tender while avoiding a dough which is overmixed and difficult to handle.

The tenderness benefit of the present invention is found in pastries, biscuits, shortbreads and shortcakes made from doughs containing the present sucrose fatty acid esters. These baked goods are distinguished from baked goods such as cookies, cakes, breads, wafers, etc. in at least two ways: the type and level of ingredients and the method of ingredients mixing.

The ingredients of pastries, biscuits, shortbreads, and shortcakes are generally comprised of flour, fat, water or milk, some flavoring substance such as salt, and some coloring substance such as milk solids or corn sugars. Other ingredients which could be added are baking powder, eggs, and sugar, but at generally low levels, less than about 20%, for example. In the case of cakes, cookies, bread, wafers, etc., the ingredient systems tend to incorporate relatively high levels of sugar (greater than about 20%) and/or leavening agents, emulsifiers, etc. in addition to flour, fat, water or milk, flavoring and coloring agents. These additional ingredients generally have a profound impact on texture, making the baked goods aerated, or chewy, or cakey, etc. On the other hand, pastries and like baked goods, which do not use these additional ingredients, tend to be unaerated, flaky, tender, etc.

The mixing of baked goods such as cookies, cakes, bread, wafers, etc. is also fundamentally different from that of pastry doughs or like baked goods. Recipes for cookies, cakes, bread, wafers, etc. generally call for intimately mixing fat and sugar together in a cream, adding the liquid ingredients, adding four and other dry ingredients and mixing with relatively high shear. This results in a much more intimately mixed fat than that in pastry doughs and other like baked goods, and differences in yield point of different fats which may be used are overcome by this vigorous, high shear mixing.

In pastry doughs and other like baked goods, a low shear method of mixing is employed. By "low shear method of mixing," as used herein, is meant methods of mixing such as cutting, folding, rubbing, layering or blending. In the case of pie crusts, for example, the fat is cut directly into the dry ingredients, and water or milk is added to this fat/dry ingredient mixture. In the case of puff pastry, the majority of the fat is layered and/or folded between layers of a dough comprised of the remaining fat, dry ingredients, and small amounts of liquid. With any of these methods of mixing employed, the result is much less intimate mixing, and the effects of differences is yield point of the fat are much more pronounced. In fact, if too much mixing is used in making the dough, it is not possible to properly handle the dough or form it into the desired shape, e.g. circle, without tearing, etc.

"Pastry doughs," as used herein, include but are not limited to pie crusts, tart shells, Fillo doughs, strudel, baklava, and the doughs of puff pastries such as patty shells, cream puffs, turnovers, eclairs, Danish pastry and French pastry. When baked, these doughs typically appear fragile, blistery, flaky, and delicate, with a golden brown color.

"Biscuits," as used herein, are the flaky biscuits known to the art, such as wheat biscuits or buttermilk biscuits. The crusts typically appear fragile, crisp, and golden brown, and the insides are generally white, fluffy and flaky. Pastries and biscuits are described in *Modern Encyclopedia of Cooking*, Vol. 1, pp. 234-237 and Vol. 2, pp. 921-1027, J.G. Ferguson Publishing, Chicago, 1959, incorporated by reference herein.

"Shortbreads," as used herein, are the flaky baked goods resembling thick pie crusts. "Shortcakes" are the flaky, biscuit-like shortcakes, not the spongy, aerated cakes sometimes called shortcakes.

It is important to note that certain baked goods may be called by the name of one of these categories, but on the basis of ingredients used or method of mixing, belong to the other category. For instance, some baked goods which are called cookies may in fact be more of a shortbread and fit the category of shortbread in this invention because of the ingredients used and method of mixing.

The present invention, then, relates to pastry doughs, biscuit doughs, and shortbread and shortcake doughs which are comprised as follows:

Pastry doughs—from about 20% to about 50% of a fat product described in detail below, from about 30% to about 70% flour, and from about 5% to about 30% of a liquid selected from the group consisting of water, milk, and mixtures thereof.

Biscuit doughs—from about 5% to about 30% of the fat product, from about 35% to about 60% flour, and from about 25% to about 45% water and/or milk.

Shortbread doughs—from about 25% to about 55% of the fat product, from about 35% to about 60% flour, and from about 0% to about 20% water and/or milk.

Shortcake doughs—from about 5% to about 30% of the fat product, from about 30% to about 65% flour, and from about 20% to about 50% water and/or milk.

The doughs of these compositions are excellent pastry, biscuit, shortbread or shortcake doughs, particularly pie doughs, which produce baked goods having improved tenderness over baked goods of the same recipe made with triglyceride shortenings or other triglyceride fat products.

If the amount of fat product is less than the amounts allowed about for any of these doughs, the gluten network will not be shortened enough and the product baked from the dough will not be tender. If the fat product is more than the amounts allowed above for any of these doughs, the product baked from the dough will be too tender to handle.

The fat product portion of the dough comprises from about 10% to about 100% sucrose fatty acid esters, and from about 0% to about 90% other fat ingredients selected from the group consisting of shortenings, margarines, fats, oils, and mixtures thereof.

The sucrose fatty acid esters, or sucrose polyesters, of the present invention are sucrose fatty acid esters esterified with at least four fatty acid groups. These components are prepared by reacting a sucrose with fatty acid as discussed below. The sucrose starting material must be esterified on at least four of the hydroxyl groups with a fatty acid containing from about 8 to about 22 carbon atoms, and preferably from about 14 to about 18 carbon atoms. Examples of such fatty acids include caprylic, capric, lauric, myristic, myristoleic, palmitic, palmitoleic, stearic, oleic, ricinoleic, lineoleic, linolenic, eleostearic, arachidic, arachidonic, benhenic, and erucic acid. The fatty acids can be derived from naturally occurring or synthetic fatty acids; they can be saturated or unsaturated, including positional and geometrical isomers. The fatty acids esterified to the sucrose molecule can be the same or mixed.

The use of sucrose esters containing four or more fatty acid ester groups has the additional benefit of providing reduced calorie baked goods, because these esters are substantially non-digestible by the human body.

A preferred sucrose fatty acid ester for use in the present invention has: (a) a total content of octa-, hepta- and hexa-esters of not less than 95 percent; (b) an octa-ester content of not less than 70 percent; and (c) a content of the penta- and lower esters of not more than 3 percent.

The sucrose fatty acid esters of the present invention also preferably have a non-Newtonian plastic rheology at 100° F. (37.8° C.). In particular, the sucrose fatty acid esters preferably have a viscosity of not less than 15 poise at 100° F. (37.8° C.) after 10 minutes of steady shear at 10 sec.$^{-1}$. The esters also preferably have a liquid/solid stability of not less than 90 percent at 100° F. (37.8° C.).

The sucrose fatty acid esters can be a single type of ester or a mixture of esters. For the preferred sucrose esters mentioned above, it is not critical that each type of ester has the above-mentioned physical properties as long as the sucrose esters as a whole have these physical properties.

Viscosity is a known rheological property and can be measured by use of an instrument such as a plate and cone viscometer (e.g., a Ferranti-Shirley viscometer, manufactured by Ferranti Electric, Inc., 87 Modular Ave., Commack, NY 11725). Additional details are provided below under the Analytical Methods section. The basics of rheology are discussed in Idson, "Rheology: Fundamental Concepts," Cosmetics and Toiletries, Vol. 93, pp. 23-30 (July 1978), incorporated by reference herein.

The sucrose fatty acid esters suitable for use herein can be prepared by a variety of methods known to those skilled in the art. These methods include: transesterification of the sucrose with methyl, ethyl or glycerol fatty acid esters using a variety of catalysts: acylation of the sucrose with a fatty acid chloride; acylation of the sucrose with a fatty acid anhydride; and acylation of the sucrose with a fatty acid, per se. As an example, the preparation of polyol fatty acid esters is described in U.S. Pat. Nos. 3,963,699; 4,517,360; and 4,518,772, (all incorporated by reference herein).

In addition to the sucrose fatty acid esters detailed above, the fat product of the present doughs comprises from about 0% to about 90% other fat ingredients such as edible fats and oils, shortenings, margarines and mixtures thereof. Any of a variety of glyceride-based oil or fat materials can be used in the present invention provided that the impact on yield point and penetration is such as to be suitable for use in the fat product portion of the doughs. In addition, these glyceride oils or fats and the present fat products can be processed with one or more of the following processes; hydrogenation, winterization, dewaxing, interesterification, etc. Any standard processing method can be used to make the present fat products.

The fats and oils comprise triglycerides, fatty acids, fatty alcohols, and esters of such acids and alcohols. Especially appropriate for use in the present invention are triglycerides of straight chain or branched chain, saturated or unsaturated, monocarboxylic acids having from 10 to 28 carbon atoms. Suitable sources of such oils include: (1) vegetable fats and oils such as soybean, corn, sunflower, rapeseed, low erucic acid rapeseed, canola, cottenseed, olive, safflower and sesame seed; (2) meat fats such as tallow or lard; (3) marine oils; (4) nut fats and oils such as coconut, palm, palm kernel, or peanut; (5) milkfat, butterfat; (6) cocoa butter and cocoa butter substitutes such as shea, or illipe butter; and (7) synthetic fats.

The other fat ingredients can also be other noncaloric or reduced calorie fats, such as branched chain fatty acid triglycerides, triglycerol ethers, polycarboxylic acid ester, sucrose polyethers, neopentyl alcohol esters, silicone oils/siloxanes, and dicarboxylic acid esters. Other partial fat replacements useful in the present compositions are medium chain triglycerides, highly esterified polyglycerol esters, acetin fats, plant sterol esters, poloxyethylene esters, jojoba esters, mono-diglycerides of fatty acids, and monodiglycerides of short-chain dibasic acids.

Polyol fatty acid polyesters can also be used as other fat ingredients in the fat product portion of the present doughs. Preferred polyol fatty acid polyesters are other sugar fatty acid polyesters, sugar alcohol fatty acid polyesters, and polyglycerol fatty acid polyesters, and mixtures thereof. The sugar fatty acid polyesters and sugar alcohol fatty acid polyesters preferably contain from 4 to 8 hydroxyl groups.

Various other additives can be used in the fat product portion of the invention provided that they are edible and aesthetically desirable and do not have any detrimental effects on the fats. The fats and ols can normally contain minor amounts of optional flavorings; emulsifiers such as the lower sucrose esters, mono- and diglycerides and lactylated glycerides; anti-spattering agents; anti-sticking agents, anti-oxidants; or the like. As with standard shortenings, nitrogen can also be added to the fat product during processing to improve the lightness of color of the product.

The fat product can also be fortified with vitamins and minerals, particularly the fat-soluble vitamins. The fat-soluble vitamins include vitamin A, vitamin D, vitamin K, and vitamin E (tocopherol). Preferably, the fat product of this invention is fortified with about 1.1 mg. d-alpha tocopheryl acetate per 1000 g sucrose fatty acid ester.

It is possible for the type of fat used to diminish the effect of the sucrose fatty acid ester. For example, if a shortening is the fat used, and it contains too high a level of triglyceride hardstock, palm hardstock for example, the penetration of the fat product will be increased negating the presence of the sucrose ester structure. There are two ways to prevent this from occurring. One is by controlling penetration of the fat product, the other is by controlling yield point.

It is critical that the fat product have a penetration between about 120 mm/10 and about 350 mm/10 at 70° F. (21° C.). If the penetration is below about 120 mm/10, the fat will be too firm to properly mix and the tenderness benefit is lost. If the penetration is above 350 mm/10, the product baked from the dough will be too tender to handle. Preferably, the fat product has a penetration between about 180 mm/10 and about 275 mm/10, and most preferably between about 225 mm/10 and about 265 mm/10.

The yield point of the fat product is also critical to providing the benefits of the present invention. If the yield point is below about 500 dynes/cm$^2$ at 70° F. (21° C.) the product baked from the dough will be too tender to handle. If the yield point is above about 10,000 dynes/cm$^2$ the tenderness benefit is lost. The fat product preferably has a yield point between about 3,000 dynes/cm$^2$ and about 9,000 dynes/cm$^2$.

Flours suitable for use in the practice of this invention include any commonly used for pastry, biscuit, shortcake or shortbread doughs. All-purpose flour, unbleached pastry flour, bread flour and cake flours can all be used.

The amount of water and/or milk which can be used in the doughs of this invention can range as shown above. Higher or lower moisture levels result in doughs which are difficult to handle and form into desired shapes.

A wide variety of other additives can be incorporated in the dough composition of this invention. Albumin is frequently added in pastry doughs to prevent soggy crust bottoms in pie pans. It may be desirable to add materials such as milk solids or corn sugar solids to the doughs to promote a golden brown color, and up to about 12%, by weight of flour, may be added to the doughs for this purpose. The doughs may also contain salt or other of the numerous materials typically used in pastry, biscuit, shortbread and shortcake doughs.

Artificial sweeteners can also be added to the present dough compositions, alone or in combintion with bulking agents, to provide an extra caloric reduction benefit. Noncaloric or reduced calorie sweeteners include, but are not limited to, aspartame, saccharin, alitame, thaumatin, dihydrochalcones, cyclamates, steviosides, glycyrrhizins, and synthetic alkoxy aromatics.

Edible preservatives also can be included in the dough compositions in amounts ranging from about 0.03% to about 0.3% by weight. Suitable edible preservatives include calcium propionate, propionic acid, sorbic acid, potassium sorbate and sodium benzoate.

A variety of methods can be used for preparing the doughs of this invention. One convenient method of preparation for pie crusts involves sifting the flour and other dry ingredients together, then adding the fat product to the dry ingredients. Using a pastry blender, for example, the fat product is cut directly into the flour mixture. Water is added in portions and mixed in with a fork, then stirred to form a dough ball. The dough is placed in a pie crust ring and rolled to fill the ring, then placed into a pie plate. Standard baking conditions are used, typically about 15 minutes at 425° F. (218° C.) for pie crusts.

The pastry, biscuit, shortbread and shortcake doughs of this invention are prepared by methods kown to the art for making these kinds of doughs. As explained above, it is critical to avoid the intimate mixing of the fat products with the other ingredients of the doughs that occurs during the preparation of cookies, cakes, breads, wafers, etc. By use of low shear mixing as described above, intimate mixing is avoided, and the tenderness benefit of the present invention is achieved. Various methods for preparing pastry and biscuit doughs are described in *Modern Encyclopedia of Cooking*, cited above. Examples of methods for preparing shortbread and shortcake doughs are described in *Joy of Cooking*, pp. 713 and 633, respectively, The Bobbs Merrill Co., Inc., Indianapolis/New York, 1975, incorporated by reference herein.

ANALYTICAL METHODS

1. Measurement of Yield Point of the Fat Product

The yield point of defined as the maximum force required in dynes/cm$^2$ to initiate deformational flow. A Ferranti Shirley Cone and Plate Viscometer equipped with a 600 gm torque spring is used and the cone specifications are as follows:

| Cone Radius (cm) | Cone Angle (Radians) | Range (dynes/cm$^2$) |
|---|---|---|
| 3.5 | 0.006241979 | 0–5775 |
| 2.0 | 0.006062441 | 0–28,500 |

Either cone may be used.

The test conditions are as follows: (1) The fat product sample and viscometer cone and plate are at 70° F. (21° C.). (2) A linear shear rate vs. time scan at 0 to 800 sec$^{-1}$ in 60 seconds is used.

2. Measurement of Penetration of the Fat Product

Penetration is a measure of the hardness or consistency of a fat. A standard method for measuring penetration of shortening is described in A.O.C.S. Official Method Cc 16-60 (incorporated by reference herein). However, the method for measuring the penetration of shortenings of the present invention is modified in several respects, for example, by the use of a modified Precision Universal Penetrometer (manufactured by Precision Scientific Co., Chicago, Ill.). The penetrating device comprising the shaft and needle (or "cone") are also modified. The same method applies to other fats such as margarines, with appropriate changes in tempering temperatures and amount of time the product is held at 70° F. (21° C.).

Apparatus:

Constant temperature boxes or room, automatically controlled to maintain the temperature at 85° F.±1° F. (29.5° C.±0.5° C.) and 70°±1° F. (21.1° C.±0.5° C.).

A specially designed needle, shaft and collar weighing 47 grams total, and described below in detail.

A titer thermometer with a temperature range of 20° to 40° C. (68° F. to 104° F.) or 15° to 35° C. (59° F. to 95°]F.), reading to 0.1° C. (0.2° F.).

A sample container, such as 1 lb. or 3 lb. can.

A Precision Universal Penetrometer, modified as described below.

Specially Designed Shaft and Needle;

The penetrating device comprising a shaft and needle (or "cone") are described and illustrated in the A.O.C.S. Official Method. For the present invention, the penetrating device is modified as follows. A 9" long hollow steel rod having a 3/16" diameter is used for the shaft. At the end of the shaft is a 2" long hollow stainless steel needle or cone. The point end of the needle has a 1/32" diameter, and the enlarged end has a 19/32" diameter. A cylindrical metal lid screws into the hollow enlarged end of the needle which can be used for holding weights. A magnesium collar with set screws is positioned around the shaft, about 4¼" from the end opposite the needle. The collar is 7/16" in diameter and ⅛" thick. The penetrating device as a whole, including the collar, must weigh 47 grams.

Precision Universal Penetrometer Modification:

In placing the needle in the housing of the instrument, the contact finger on the depth gauge is positioned below the collar. The collar is adjusted on the shaft so as to allow the depth gauge its full travel of 520 units. This is accomplished by moving the shaft upward until the cone is about two centimeters below the bottom of the housing and then sliding the collar up against the top of the housing and tightening the set screw. Next the shaft is lowered exactly two centimeters. Using the gauge block adjust the depth gauge contact finger all the way up against the collar using the adjuster screw. Remove the shaft and needle, pin the collar to the shaft and adjust the weight of 47 grams.

Conditioning of Sample:

The shortening sample is tempered at 85°±1° F. (29.5°±0.5° C.) for 24 hours and then stored at 70°±1° F. (21.1° C.±0.5° C.) for 24 hours. Other types of fat, margarine for example, may be tempered at other temperatures and held at 70° F. (21° C.) for a shorter time. Refrigerated fats are generally softened before use in recipes by letting them set at room temperature for about 15 minutes. For the intent of the penetration measurement, penetrations of refrigerated products should be made after the product has first reached 70° F. (21° C.).

Checking the Penetrometer:

Check the needle rise against the 2 cm. gauge-block as follows: With the indicator and depth gauge in the zero position lower the penetrometer head by means of the course adjusting screw until the point of the needle just touches the pad block (large diameter block) then lock the screw in this position. Squeeze the clutch trigger and raise the needle to the extreme top position (collar touching the top of the housing). Check the distance between the needle point and pad by placing the 2 cm. gauge block on the pad and carefully passing it under the needle point; the needle point should just clear the 2 cm. gauge block. If the distance so determined is not exactly 2 cm., adjust the depth gauge adjusting screw until the rise and fall of the needle is exactly 2 cm. Set the depth gauge indicator needle to read zero by removing the face plate cover and loosening the knurled nut holding the needle in place. This check should be made once before each series of measurements.

Operation:

If possible make all penetrations in a room controlled at 70°±1° F. (21.1°±0.5° C.). If this is impossible, conduct the actual penetration operation immediately after the sample is removed from the 70° F. (21.1° C.) box. Smooth the surface of the sample by scraping, but do not disturb the contents of the can below about 0.25" of the original surface of the shortening. Immediately place the sample container on the shelf of the penetrometer, which has been leveled previously by means of the leveling screws in the base. Penetrate each sample at three or more points at least one inch apart and at least one inch from the side of the container, being certain to clean the needle by wiping with a tissue between each penetration. Under no circumstances should the needle be removed from the shaft for cleaning purposes. (Insert the thermometer in the center of the sample up to its immersion mark and record temperature to 0.1° C. (0.2° F.). The temperature at which the penetration test is made should be 21.1°±0.5° C. [70°±1° F.]) The average of the penetrations is recorded as the uncorrected penetration. This value is corrected for penetration temperature deviation as follows: a correction of 0.5 points for every 0.1° C. (0.2° F.) above or below 21.1° C. (70° F.) should be made. If below 21.1° C. (70° F.), add the correction; if above, subtract.

Bring the indicator to zero by pulling up on the depth gauge until it stops, then squeeze the clutch trigger and again pull up on the depth gauge until it reaches zero. Release the clutch trigger. If the indicator does not read zero, adjust with the zero setting screw. By means of the coarse adjusting screw, bring the needle down until its point just touches the surface of the sample. Grasp the top of the needle, squeeze the clutch trigger and pull the needle top as far as it will go. This will raise the needle two centimeters above the sample. Release the clutch trigger. Push the depth gauge down as far as it will go.

Release the needle by squeezing the clutch trigger. In operating the clutch trigger, grasp the finger grip firmly with the forefinger, and with the thumb depress the clutch trigger quickly as far down as it will go. Pull the depth gauge up until it stops. Read the dial. The reading is the penetration in tenths of a millimeter (mm/10).

3. Viscosity Measurement of the Sucrose Fatty Acid Ester a. Sample Preparation

The sucrose fatty acid ester is heated until it completely melts and is thoroughly mixed. Ten grams of the melted sample is weighed into a pre-heated 20 ml glass vial. The sample is then allowed to recrystallize at 100° F.±5° F. (37.8° C. ±3° C.) for 24 hours. After the 24 hour time period has elapsed, the sample is taken to the viscometer and viscosity is measured.

b. Ferranti-Shirley Viscometer Operation Procedure

A Ferranti-Shirley viscometer equipped with a 600 gm torque spring is used for the viscosity measurement of the sucrose fatty acid ester. A cone is put into place, and the viscometer temperature is adjusted to 100° F. (37.8° C.). The chart recorder is calibrated, and the gap between the cone and plate is set. The cone speed is checked, and the cone and plate temperatures are equilibrated to 100° F. (37.8° C.). The panel controls are set. Sufficient sample is placed between the plate and the cone so that the gap is completely filled. The temperature is allowed to stabilize at 100° F. (37.8° C.) for about 30 seconds, and then the coned rotation and recording are started. A rheogram for the sucrose fatty acid ester is recorded and analyzed to determine the viscosity. Viscosity is measured at 10 seconds$^{-1}$ after 10 minutes of steady shear.

4. Liquid/Solid Stability Measurement of the Sucrose Fatty Acid Ester

The sucrose fatty acid ester sample is heated until it completely melts and is thoroughly mixed. The sample is then poured into Beckman #344062 4.4 ml. centrifuge tubes. The tubes are immediately transferred to a 100° F.±5° F. (37.8° C.±3° C.) constant temperature room and allowed to recrystalline undisturbed for 24 hours. The samples are then centrifuged at 60,000 rpm for one hour at 100° F. (37.8° C.) (the centrifuge and centrifuge head is previously equilibrated at 100° F. [37.8° C.]). The force on the samples is 486,000 G's. The liquid/solid stability is then calculated as follows:

Liquid/Solid Stability =

$$\frac{100 \times (\text{total volume of sample} - \text{volume of liquid})}{\text{total volume of sample}}$$

Although the present invention has been described and illustrated with reference to specific examples, it will be understood that modifications and variations can be made without departing from the spirit and scope of the invention.

EXAMPLE 1

Pie crusts are prepared as follows:

| Pie Crust Recipe: | |
|---|---|
| Flour | 148 grams |
| Shortening | 98 grams |
| Water | 45 grams |
| Salt | 2.5 grams |

Method of Preparation

1. Sift flour and salt together.
2. Add shortening to flour and salt mixture. Using a pastry blender, cut shortening into four with 20 strokes, scrape bowl 3 times, cut 20 strokes, and scrape bowl 3 times, cut 10 strokes, and scrape bowl 3 times.
3. Add about one-third of the water. Mix with a fork for 10 strokes. Repeat two more times until all the water has been added.
4. Stir mixture using a fork for 30 strokes to form a ball.
5. Tape a sheet of waxed paper to counter top and spread one-half a teaspoon of flour on paper.
6. Use a 3/32 inch pie crust ring to roll out dough. Place ring on flour-coated paper. Place dough in center of ring and cover with a second piece of waxed paper.
7. Roll dough in all directions to fill the ring.
8. Place rolled dough into a 9 inch glass pie plate. Crimp edges and prick dough with a fork.
9. Bake at 425° F. (218° C.) for 15 minutes.

Different types of shortening are used to make the pie crusts. Several groups of pie crusts are prepared using commercially available shortenings. Other groups are prepared using different kinds of sucrose fatty acid ester-containing shortenings. The sucrose fatty acid ester shortenings have the following composition:

TABLE 1

| | Sucrose Fatty Acid Ester Shortenings | | | |
|---|---|---|---|---|
| Component | Shortening A | Shortening B | Shortening C | Shortening D |
| Unhardened soybean oil, IV about 130 | 61.5 (wt. %) | — | — | — |
| Partially hydrogenated soybean oil, IV about 107 | — | 58.5 (wt. %) | 58.5 (wt. %) | 58.5 (wt. %) |
| Sucrose fatty acid ester made from blend of partially and nearly completely hardened soybean oil methyl esters, IV about 45 | 29.0 | 28.0 | 28.0 | 28.0 |
| Sucrose fatty acid ester made from nearly completely hardened soybean oil methyl esters, IV about 8 | 4.0 | 5.0 | 5.0 | 5.0 |
| Emulsifier (mono- and diglycerides) | 0.75 | 4.5 | 4.5 | 4.5 |
| Nearly completely hardened palm oil, IV less than 4 | 4.5 | 4.0 | 4.0 | 4.0 |
| | 100.0 | 100.0 | 100.0 | 100.0 |
| Additional, Vitamin E as d-alpha tocopheryl acetate | — | — | — | 1.1 mg/1000 g. sucrose fatty acid ester |
| % Nitrogen | 20 | 12 | 20 | 12 |
| Penetration (at 70° F. [21° C.], mm/10) | 274 | 232 | 193 | 250 |
| Yield Point (at 70° F. [21° C.], dynes/cm$^2$) | 1150 | 7,900 | 7,400 | 4,100 |

TABLE 1-continued

| | Sucrose Fatty Acid Ester Shortenings | | | |
|---|---|---|---|---|
| Component | Shortening A | Shortening B | Shortening C | Shortening D |

The sucrose fatty acid esters with an IV of about 45 have the following distributions: Shortening A - 91.8% octa, 8.2% hepta, less than 0.1% hexa, and less than 0.2% penta and lower. Shortenings B and C - 81.8% octa, 18.2% hepta, less than 0.1% hexa, and less than 0.2% penta and lower. Shortening D - 84.5% octa, 15.5% hepta, 0.1% hexa, and less than 0.2% penta and lower. The sucrose fatty acid esters with an IV of about 8 all have the following ester distribution: 92.4% octa, 7.6% hepta, less than 0.1% hexa, and less than 0.2% penta and lower.
The blend of sucrose fatty acid esters used to make Shortening D have: a viscosity of 79 poise at 100° F. (37.8° C.), at 10 sec$^{-1}$ and at t = 10 minutes; and a liquid/solid stability of 95% at 100° F. (37.8° C.), at 486,000 g and at 1 hour. The blend of sucrose fatty acid esters used to make shortenings A, B and C have viscosities and liquid/solid stabilities that fall within the ranges of the preferred sucrose fatty acid esters of the present invention The pie crusts are taste tested by two methods, expert panels and building panels:

Expert Panels

Results from several taste tests using expert panelists show that the sucrose fatty acid ester-containing shortenings make pie crusts that are more tender than pie crusts prepared with conventional triglyceride shortenings. These panels are conducted with 5-10 judges.

Each test consists of a blind paired comparison of two pie crusts prepared with different shortenings. Panelists sample each pie crust. They are then asked to choose which sample is more tender and to rate the degree to which it is more tender by using the following 5-point scale:
0 = the products are equally tender
1 = very slightly more tender
2 = slightly more tender
3 = more tender
4 = a lot more tender
Each scale unit is referred to as a Panelist Score Unit. A t test analysis is performed on the data to determine if the products are statistically different.

Building Panels

Building panels are conducted using a much larger base size of panelists. These tests are also blind paired comparison taste tests of two pie crusts prepared with different shortenings.

Panelists taste each product and rate the products on a 9 point liking scale for several attributes, one of which is tenderness. Each product is graded on the following 9-Point Liking Scale for tenderness:
−4 = dislike the most possible
−3 = dislike extremely
−2 = dislike very much
−1 = dislike
0 = neutral
1 = like
2 = like very much
3 = like extremely
4 = like the most possible The following types of commercially available shortenings are tested:

| Commercial Shortening | Type of Shortening |
|---|---|
| E | premium, all vegetable |
| F | pre-creamed, part animal fat, part vegetable oils |
| G | low-cost store brand, part animal fat, part vegetable oils |

-continued

| | | |
|---|---|---|
| H | animal fat | |
| I | store brand, all vegetable | |
| J | all vegetable | |

Results of Expert Panels

| Test Shortening | Control | Tenderness PSU |
|---|---|---|
| Commercial F | Commercial E | −0.50 |
| Commercial G | E | −1.30 |
| Sucrose fatty acid ester shortening A | E | 2.07 s |
| Commercial H | E | −1.50 |
| Commercial I | E | 1.00 |
| Commercial J | E | −1.00 |
| Sucrose fatty acid ester shortening B | E | 1.89 s |
| Sucrose fatty acid ester shortening C | E | 1.60 s |
| Sucrose fatty acid ester shortening D | E | 2.25 s |

A negative PSU means the control product is more tender.
A positive PSU means the test product is more tender.
s = significance at 95% confidence Results of Building Panel This test is conducted with sucrose fatty acid ester shortening D versus commercial shortening E.

| | Sucrose Fatty Acid Ester Shortening D | | Commercial Shortening E |
|---|---|---|---|
| (Base) | | | (40) |
| Overall preference 9-Point Liking Scale | 70 | s | 30 |
| Tenderness | 2.22 | s | 0.92 |
| Flakiness | 2.07 | s | 1.05 |
| Texture | 2.07 | s | 1.05 |

The sucrose fatty acid ester shortening pie crust is significantly preferred over the commercial shortening E pie crust for tenderness, flakiness and texture.

EXAMPLE 2

Puff Pastry is prepared as follows:

Ingredients 1 cup sucrose fatty acid ester shortening D (see Example 1)
1½ cups all-purpose flour
½ cup sifted cake flour
¼ teaspoon salt
¾ cup cold water Method of Preparation Set 2 tablespoons of shortening aside. Place remaining shortening between two pieces of lightly floured waxed paper. Shape shortening into a 5-inch square with slightly rounded edges. Wrap in plastic wrap. Refrigerate while making dough.

Combine flour and salt in a bowl. Work reserved 2 tablespoons shortening into flour by rubbing together between the fingers. Add water; stir with a fork until dry ingredients are moistened. Turn dough onto a lightly floured surface; knead 30 times. Cover by inverting bowl over dough. Let rest 10 minutes.

Lightly flour a smooth surface. Roll dough to an 8-inch circle. Mark a 6-inch square within circle of dough. Roll each side of square until dough resembles a flower with 4 petals. (Center of dough will be thick.)

Place chilled shortening square on center square of dough. Fold dough over shortening, one side at a time, bringing edges to center and overlapping slightly. Wrap in plastic wrap, and refrigerate 15 minutes.

Lightly flour surface, and add flour as necessary during following procedure. Place dough, flat side down, on surface. Press rolling pin firmly on dough 7 times, once in center and 3 times above and below center to flatten dough and seal edges. Roll dough into a 14×16 inch rectangle, keeping thickness of dough as even as possible, and corners square.

Fold dough in thirds to resemble a folded letter. Give dough a quarter turn to the right. Press with rolling pin to seal edges. Repeat rolling and folding procedure, and refrigerate 15 minutes.

Repeat rolling and folding procedure 4 additional times, refrigerating dough for 15 minutes after every two turns. Dough will be rolled and folded a total of 6 turns. Refrigerate 15 minutes or longer before using in a recipe.

Form into pastry and fill as desired (before or after baking). Bake pastry dough at 500° F. (260° C.) for 5 minutes, reduce the heat to 375° F. (191° C.) and bake for about 25-35 minutes more.

EXAMPLE 3

Roll biscuits are prepared as follows:

Ingredients 220 g flour (all-purpose flour) (2 cups)
65 g sucrose fatty acid ester shortening D of Example 1 (⅓ cup)
13.3 g baking powder (3½ teaspoons)
5 g salt (1 teaspoon)
160 g whole milk (⅔ cup)

Method of Preparation

1. Cut shortening into sifted flour, baking powder and salt mixture with pastry blender until it looks like coarse cornmeal.
2. Remove one cup of dry mixture to small bowl and blend with milk just enough to hold dough together.
3. Combine remainder of dry mixture with dough.
4. Transfer to floured (1 tablespoon) board.
5. Knead lightly about 4 times.
6. Roll dough ½ inch thick and cut with floured cutter.
7. Place on cookie sheet and bake at 425° F. (218° C.) for 10 to 10½ minutes.

EXAMPLE 4

Shortbread is prepared as follows:

Ingredients 1 cup sucrose acid ester shortening D (see Example 1)
2 cups shifted all-purpose flour
½ cup shifted confectioners' sugar
¼ teaspoon salt Method of Preparation Preheat over to 325° F. (163° C.). Blend the sifted dry ingredients into the shortening. Pat the stiff dough into an ungreased 9×9-inch pan and press edges down. Pierce with a fork through the dough every half-inch. Bake 25 to 30 minutes.

EXAMPLE 5

Shortcake is prepared as follows:

Ingredients

1¾ cups sifted all-purpose flour
1 teaspoon salt
3 teaspoons double-acting baking powder
1 tablespoon sugar
4 to 6 tablespoons sucrose fatty acid ester shortening D (see Example 1)
¾ cup milk

Method of Preparation

Preheat over to 450° F. (232° C.). Cut shortening into sifted dry ingredients, then make a well in the center. Add milk all at once. Stir until the dough is fairly free from the sides of the bowl. Turn the dough onto a lightly floured board. Knead gently and quickly, making about eight to ten folds. Roll with a lightly floured rolling pin, until the dough has the desired thickness. Cut with a biscuit cutter dipped in a very little flour. Place on an ungreased baking sheet. Bake until lightly browned—12 to 15 minutes.

What is claimed is:

1. A pastry dough selected from the group consisting of pie doughs and tart shell doughs, said pastry dough comprising:
    (a) from about 20% to about 50% of a fat product comprising:
        (i) from about 10% to about 100% sucrose fatty acid esters having at least 4 fatty acid ester groups, wherein each fatty acid group has from about 8 to about 22 carbon atoms; and
        (ii) from about 0% to about 90% other fat ingredients selected from the group consisting of shortenings, margarines, fats, oils, and mixtures thereof;
        (iii) wherein the fat product has a penetration between about 120 mm/10 and about 350 mm/10 at 70° F. (21° C.);
        (iv) wherein the fat product has a yield point between about 500 dynes/cm$^2$ and about 10,000 dynes/cm$^2$ at 70° F. (21° C.);
    (b) from about 30% to about 70% flour; and
    (c) from about 5% to about 30% of a liquid selected from the group consisting of water, milk, and mixtures thereof;
said pastry dough being made by a process employing a low shear method of mixing.

2. A pastry dough according to claim 1 wherein the sucrose esters have: (i) a non-Newtonian plastic rheology at 100° F. (37.8° C.), in particular a viscosity of not less than 15 poise at 100° F. (37.8° C.) after 10 minutes of steady shear at 10 sec.$^{-1}$, and (ii) a liquid/solid stability of not less than 90% at 100° F. (37.8° C.).

3. A pastry dough according to claim 2 wherein the penetration of the fat product is between about 180 mm/10 and about 275 mm/10 at 70° F. (21° C.).

4. A pastry dough according to claim 3 wherein the penetration of the fat product is between about 225 mm/10 and about 265 mm/10 at 70° F. (21° C.).

5. A pastry dough according to claim 4 wherein the yield point of the fat product is between about 3,000 dynes/cm$^2$ and about 9,000 dynes/cm$^2$ at 70° F. (21° C.).

6. A pastry dough according to claim 1 comprising a pie dough.

7. A baked good made from the dough of claim 1.

8. A baked good made from the dough of claim 6.

9. A shortbread dough comprising:
    (a) from about 25% to about 55% of a fat product comprising:
        (i) from about 10% to about 100% sucrose fatty acid esters having at least 4 fatty acid ester groups, wherein each fatty acid group has from about 8 to about 22 carbon atoms; and
        (ii) from about 0% to about 90% other fat ingredients selected from the group consisting of shortenings, margarines, fats, oils, and mixtures thereof;
        (iii) wherein the fat product has a penetration between about 120 mm/10 and about 350 mm/10 at 70° F. (21° C.); and
        (iv) wherein the fat product has a yield point between about 500 dynes/cm$^2$ and about 10,000 dynes/cm$^2$ at 70° F. (21° C.);
    (b) from about 35% to about 60% flour; and
    (c) from about 0% to about 20% of a liquid selected from the group consisting of water, milk, and mixtures thereof;
said shortbread dough being made by a process employing a low shear method of mixing.

10. A shortbread dough according to claim 9 wherein the sucrose esters have: (i) a non-Newtonian plastic rheology at 100° F. (37.8° C.), in particular a viscosity of not less than 15 poise at 100° F. (37.8° C.) after 10 minutes of steady shear at 10 sec.$^{-1}$, and (ii) a liquid/solid stability of not less than 90% at 100° F. (37.8° C.).

11. A shortbread dough according to claim 10 wherein the penetration of the fat product is between about 180 mm/10 and about 275 mm/10 at 70° F. (21° C.).

12. A shortbread dough according to claim 11 wherein the penetration of the fat product is between about 225 mm/10 and about 265 mm/10 at 70° F. (21° C.).

13. A shortbread dough according to claim 12 wherein the yield point of the fat product is between about 3,000 dynes/cm$^2$ and about 9,000 dynes/cm$^2$ at 70° F. (21° C.).

14. A baked good made from the dough of claim 9.

* * * * *